US012209570B1

(12) United States Patent
Gonzalez

(10) Patent No.: US 12,209,570 B1
(45) Date of Patent: Jan. 28, 2025

(54) MULTIPLE GENERATOR WIND TURBINE SYSTEM

(71) Applicant: Henry Gonzalez, Upland, CA (US)

(72) Inventor: Henry Gonzalez, Upland, CA (US)

( * ) Notice: Subject to any disclaimer, the term of this patent is extended or adjusted under 35 U.S.C. 154(b) by 0 days.

(21) Appl. No.: 18/520,777

(22) Filed: Nov. 28, 2023

Related U.S. Application Data

(60) Provisional application No. 63/527,138, filed on Jul. 17, 2023.

(51) Int. Cl.
| | | |
|---|---|---|
| *F03D 15/00* | (2016.01) | |
| *F03D 7/04* | (2006.01) | |
| *F03D 13/20* | (2016.01) | |
| *H02K 7/116* | (2006.01) | |
| *H02K 7/18* | (2006.01) | |

(52) U.S. Cl.
CPC ......... *F03D 15/207* (2023.08); *F03D 7/042* (2013.01); *F03D 13/2005* (2023.08); *H02K 7/116* (2013.01); *H02K 7/183* (2013.01); *F05B 2240/913* (2013.01); *F05B 2260/404* (2013.01); *F05B 2270/1033* (2013.01); *F05B 2270/32* (2013.01)

(58) Field of Classification Search
CPC .... F03D 15/207; F03D 7/042; F03D 13/2005; H02K 7/116; H02K 7/183; F05B 2240/913; F05B 2260/404; F05B 2270/1033; F05B 2270/32
See application file for complete search history.

(56) References Cited

U.S. PATENT DOCUMENTS

| | | | |
|---|---|---|---|
| 7,397,143 B2 | 7/2008 | Walling | |
| 8,330,296 B2 | 12/2012 | Ottman | |
| 8,502,403 B2 | 8/2013 | Merswolke et al. | |
| 11,009,010 B1 | 5/2021 | Saavedra | |
| 2010/0026010 A1 | 2/2010 | Pabst | |
| 2013/0277971 A1* | 10/2013 | Cho .......................... | H02P 9/04 290/55 |

FOREIGN PATENT DOCUMENTS

| | | |
|---|---|---|
| CN | 112145363 B | 4/2022 |
| KR | 101027055 B1 | 4/2011 |
| KR | 101377818 B1 | 3/2014 |

\* cited by examiner

*Primary Examiner* — Joseph Ortega
(74) *Attorney, Agent, or Firm* — Jafari Law Group, Inc.

(57) ABSTRACT

The present invention is a wind turbine system with multiple generator modules that maximize the use of the mast of a wind turbine by implementing an electrical generator module with a magnetic assembly. In some embodiments, the system includes a set of blades adapted to rotate on a horizontal axis and coupled to a first rotor. A first generator is coupled to the first rotor and disposed within a housing. The mast of the system extends from the housing and encloses a second generator module. A gearbox module is adapted to engage the first rotor through a first gear shaft and engage the second rotor through a second gear shaft. The gearbox module may be adapted to selectively engage the second generator module when a windspeed exceeds a threshold windspeed. A magnetic assembly disposed within the mast is adapted to induce an electric current.

20 Claims, 11 Drawing Sheets

MULTIPLE GENERATOR WIND TURBINE SYSTEM

PRIORITY CLAIM

The present application is a Non-Provisional Application that claims the benefit to U.S. Provisional Application of U.S. 63/527,138, filed Jul. 17, 2023, the entire contents of which is incorporated herein.

TECHNICAL FIELD OF THE INVENTION

The present invention relates generally to wind turbines. More specifically, the present invention relates to a wind turbine system including multiple generator modules with at least one generator module that maximizes the use of the mast of a wind turbine by utilizing it as an electrical generator module in addition to its traditional use for structural support.

COPYRIGHT AND TRADEMARK NOTICE

A portion of the disclosure of this patent application may contain material that is subject to copyright protection. The owner has no objection to the facsimile reproduction by anyone of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is by way of example and should not be construed as descriptive or to limit the scope of this invention to material associated only with such marks.

BACKGROUND OF THE INVENTION

Conventional wind turbines have been widely used to harness wind energy and convert it into electricity. These turbines typically consist of blades mounted on a horizontal axis, connected to a generator within the nacelle of the turbine. The kinetic energy of the rotating blades drives the generator and, ultimately, the production of electricity. However, such systems often face limitations, including a threshold windspeed required to initiate rotation and the need for braking mechanisms to prevent damage to the wind turbine during high wind conditions. The inherent resistance to get the propeller to spin, given a constant, is fairly consistent in conventional wind turbines, making it necessary to stop the turbine when wind speeds exceed safe limits.

Most conventional wind turbines also fail to fully utilize the potential of the mast of the wind turbine. In most conventional designs, the mast primarily serves as a structural support, with minimal functional contributions to energy conversion.

Therefore, there exists a previously unappreciated need for a new and improved wind turbine system that can significantly increase the overall power output and utilize the mast of the wind turbine for not only structural support, but to increase the wind turbine's power generation capability by utilizing the interior hollow space of the mast to extend the energy collection system.

It is to these ends that the present invention has been developed.

SUMMARY OF THE INVENTION

To minimize the limitations in the prior art, and to minimize other limitations that will be apparent upon reading and understanding the present specification, the present invention describes a wind turbine system.

In one exemplary embodiment of the present invention, a wind turbine system comprises a set of blades adapted to rotate on a horizontal axis and coupled to a first rotor; a first generator coupled to the first rotor, the first generator disposed within a housing; a mast extending from the housing; a second rotor and a second generator located at least partially within the mast; a first gearbox adapted to engage the first rotor through a first gear shaft and to engage the second rotor through a second gear shaft; a second gearbox adapted to selectively engage or disengage the second rotor and the second generator when a windspeed exceeds a threshold windspeed; and a magnetic assembly disposed within the mast and coupled to the second gearbox, the magnetic assembly adapted to induce an electric current, wherein the magnetic assembly includes a plurality of magnets situated along an outer wall of the second rotor.

In some exemplary embodiments, a wind turbine system in accordance with the present invention further comprises a controller adapted to monitor the windspeed. In some exemplary embodiments, the controller is further adapted to engage or disengage the second gearbox based on the windspeed exceeding the threshold windspeed. In some exemplary embodiments, the second gearbox is further adapted to increase a resistance required to rotate the set of blades. In some exemplary embodiments, the second gearbox is further adapted to selectively couple or decouple the second rotor. In some exemplary embodiments, the second gear shaft includes an input shaft and an output shaft, the input shaft adapted to disconnect from the output shaft. In some exemplary embodiments, the input shaft is further adapted to transfer mechanical power to the output shaft. In some exemplary embodiments, the second gearbox is adapted to engage or disengage the magnetic assembly based on the windspeed exceeding the threshold windspeed. In some exemplary embodiments, the magnetic assembly is further adapted to rotate within the mast when engaged.

In another exemplary embodiment of the present invention, a wind turbine system comprises a set of blades adapted to rotate on a horizontal axis and coupled to a first rotor; a first generator coupled to the first rotor, the first generator disposed within a housing; a mast extending from the housing; a second rotor and a second generator located at least partially within the mast; a first gearbox adapted to engage the first rotor through a first gear shaft and to engage the second rotor through a second gear shaft; a second gearbox adapted to selectively engage or disengage the second rotor and the second generator when a windspeed exceeds a threshold windspeed; and a magnetic assembly disposed within the mast and coupled to the second gearbox, the magnetic assembly adapted to induce an electric current, wherein the magnetic assembly includes a plurality of magnets situated along an outer wall of the second rotor.

In some exemplary embodiments, a wind turbine system in accordance with the present invention further comprises an inner mast wall and an outer mast wall defining an inner volume therebetween. In some exemplary embodiments, the inner volume is adapted to house a set of coiled wires. In some exemplary embodiments, the set of coiled wires is adapted to have a voltage induced in them by the magnetic assembly.

In yet another exemplary embodiment, a wind turbine system comprises a set of blades adapted to rotate on a horizontal axis and coupled to a first rotor; a first generator coupled to the first rotor, the first generator disposed within a housing; a mast extending from the housing; a second rotor and a second generator located at least partially within the mast; a first gearbox adapted to engage the first rotor through a first gear shaft and to engage the second rotor through a second gear shaft; a second gearbox adapted to selectively engage or disengage the second rotor and the second generator when a windspeed exceeds a threshold windspeed; a structural support adapted to rotate and coupled to a magnetic assembly; and the magnetic assembly disposed within the mast and coupled to the second gearbox, the magnetic assembly adapted to induce an electric current, wherein the magnetic assembly includes a plurality of magnets situated along an outer wall of the second rotor.

In some exemplary embodiments, a wind turbine system in accordance with the present invention further comprises an inner mast wall and an outer mast wall defining an inner volume therebetween, the inner volume adapted to house a first set of coiled wires. In some exemplary embodiments, a wind turbine in accordance with the present invention further comprises a set of struts, the set of struts adapted to couple the second rotor and the structural support. In some exemplary embodiments, a wind turbine in accordance with the present invention further comprises a central housing, the central housing situated within the mast and adapted to at least partially house the second gearbox and the second rotor. In some exemplary embodiments, a wind turbine in accordance with the present invention further comprises a second set of coiled wires situated on an outer wall of the central housing. In some exemplary embodiments, the first set of coiled wires and the second set of coiled wires are adapted to have a voltage induced in them by the magnetic assembly.

These advantages and features of the present invention are not meant as limiting objectives, but are described herein with specificity so as to make the present invention understandable to one of ordinary skill in the art.

Various objective and advantages of the present invention will become apparent from the following description taken in conjunction with the accompanying drawings, wherein are set forth, by way of illustration and example, certain embodiments of the invention. The drawings submitted herewith constitute a part of this specification, include exemplary embodiments of the present invention, and illustrate various objects and features thereof.

BRIEF DESCRIPTION OF THE DRAWINGS

Elements in the figures have not necessarily been drawn to scale in order to enhance their clarity and improve understanding of the various embodiments of the invention. Furthermore, elements that are known to be common and well understood to those in the industry are not depicted in order to provide a clear view of the various embodiments of the invention. The drawings that accompany the detailed description can be briefly described as follows.

DESCRIPTION OF THE INVENTION

Figure 1:
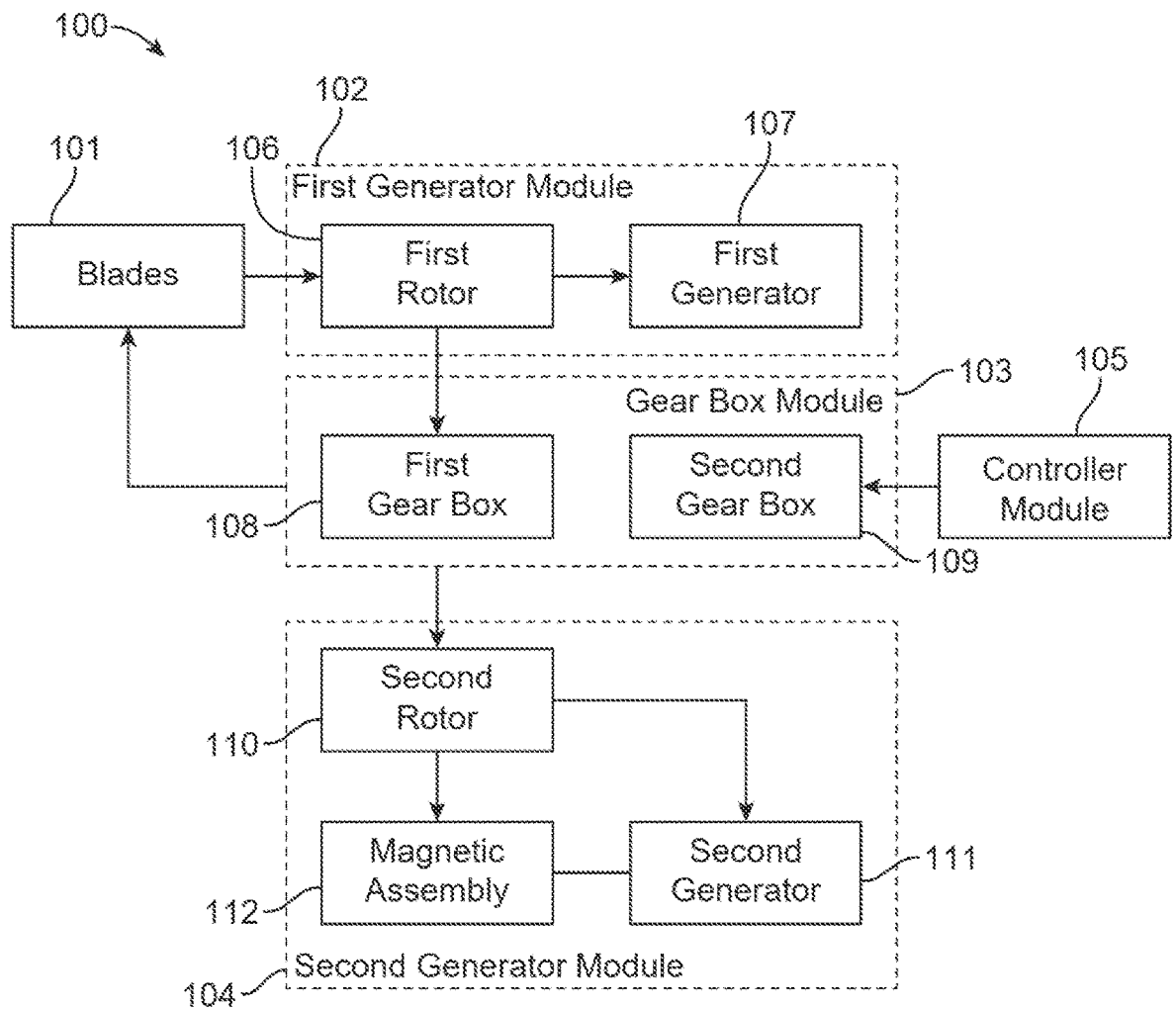
FIG. 1 illustrates a block diagram in accordance with some exemplary embodiments of the present invention.

In the following discussion that addresses a number of embodiments and applications of the present invention, reference is made to the accompanying drawings that form a part thereof, where depictions are made, by way of illustration, of specific embodiments in which the invention may be practiced. It is to be understood that other embodiments may be utilized, and changes may be made without departing from the scope of the invention. Wherever possible, the same reference numbers are used in the drawings and the following description to refer to the same or similar elements.

In the following detailed description, numerous specific details are set forth by way of examples in order to provide a thorough understanding of the relevant teachings. However, it should be apparent to those skilled in the art that the present teachings may be practiced without such details. In other instances, well known structures, components and/or functional or structural relationship thereof, etc., have been described at a relatively high-level, without detail, in order to avoid unnecessarily obscuring aspects of the present teachings.

Throughout the specification and claims, terms may have nuanced meanings suggested or implied in context beyond an explicitly stated meaning. Likewise, the phrase "in one embodiment/example" as used herein does not necessarily refer to the same embodiment and the phrase "in another embodiment/example" as used herein does not necessarily refer to a different embodiment. It is intended, for example, that claimed subject matter include combinations of example embodiments in whole or in part.

Conditional language used herein, such as, among others, "can," "could," "might," "may," "e.g.," and the like, unless specifically stated otherwise, or otherwise understood within the context as used, is generally intended to convey that certain embodiment include, while other embodiments do not include, certain features, elements and or steps. Thus, such conditional language is not generally intended to imply that features, elements and or steps are in any way required for one or more embodiments, whether these features, elements and or steps are included or are to be performed in any particular embodiment.

The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present. The term "and or" means that "and" applies to some embodiments and "or" applies to some embodiments. Thus, A, B, and or C can be replaced with A, B, and C written in one sentence and A, B, or C written in another sentence. A, B, and or C means that some embodiments can include A and B, some embodiments can include A and C, some embodiments can include B and C, some embodiments can only include A, some embodiments can include only B, some embodiments can include only C, and some embodiments include A, B, and C. The term "and or" is used to avoid unnecessary redundancy. Similarly, terms, such as "a, an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

While exemplary embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the invention or inventions disclosed herein. Accordingly, the following detailed description does not limit the disclosure. Instead, the proper scope of the disclosure is defined by the appended claims.

As used in this disclosure, the term "comprise" and variations of the term, such as "comprising" and "comprises", are not intended to exclude other additives, components, integers or steps.

For purpose of description herein, the terms "upper", "lower", "left", "right", "front", "rear", "horizontal", "vertical" and derivatives thereof shall relate to the invention as oriented in figures. However, it is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristic relating to the embodiments disclosed herein are not to be considered as limiting, unless the claims expressly state otherwise.

Turning now to the figures, FIG. 1 is a block diagram of an exemplary wind turbine system 100 utilizing two generator modules 102, 104 in accordance with the present invention. More specifically, FIG. 1 depicts system 100, comprising a set of blades 101, a first generator module 102, a gearbox module 103, a controller module 105, and a second generator module 104.

In some exemplary embodiments, the set of blades 101 may be adapted to rotate on an axis. In some exemplary embodiments, the set of blades 101 may be adapted to rotate on a horizontal axis. In some exemplary embodiments, the set of blades 101 may be made with carbon fiber composites. In other exemplary embodiments, the set of blades 101 may be constructed with other materials known to those of ordinary skill in the art. In some exemplary embodiments, the set of blades 101 may be comprised of three blades attached to a central hub. In some exemplary embodiments, the set of blades 101 may be attached to a first rotor 106 of system 100. In some exemplary embodiments, the set of blades 101 may have an inherent resistance that requires a certain windspeed to rotate the set of blades 101. In some exemplary embodiments, the inherent resistance that must be overcome to rotate the set of blades 101 determines the available mechanical energy in the wind turbine system 100. In some exemplary embodiments, which will be discussed in more detail below, the inherent resistance to rotate the set of blades 101 may be determined by the gearbox module 103.

In some exemplary embodiments, which will be discussed in more detail below, the first generator module 102 may include various components, including a first rotor 106 and a first generator 107. In some exemplary embodiments, the set of blades 101 may be coupled to a first rotor 106 which, in turn, may be coupled to a first generator 107. In some exemplary embodiments, the first generator module 102 is disposed within a housing situated at the top of the wind turbine directly above the mast of the wind turbine. In other exemplary embodiments, the first rotor 106 may be coupled to a first generator 107 through the gearbox module 103.

In some exemplary embodiments, the kinetic energy from the wind that rotates the set of blades 101 may be converted into mechanical energy which, in turn, may rotate a first rotor 106 coupled to the set of blades 101. In some exemplary embodiments, the mechanical energy of the first rotor 106 may be a low speed, high torque rotational force. In some exemplary embodiments, the first rotor 106 may be coupled to a gearbox module 103 and may transfer the rotational energy from the set of blades 101 to the gearbox module 103. In some exemplary embodiments, the gearbox module 103 may convert the mechanical energy from the high torque, low speed rotational energy of the first rotor 106 to a high speed, low torque rotational output that is necessary to generate electricity.

In some exemplary embodiments, as depicted by FIG. 1, the gearbox module 103 may include various components, including a first gearbox 108 and a second gearbox 109. In some exemplary embodiments, the second gearbox 109 of the gearbox module 103 may be adapted to selectively engage the second generator module 104 under certain circumstances. In some exemplary embodiments, the second gearbox 109 may be adapted to engage the second generator module 104 when a windspeed exceeds a threshold windspeed. When the windspeed does not exceed the threshold windspeed, the second gearbox 109 may be adapted to disengage the second generator module 104 and the mechanical energy available in the wind turbine system 100 may be entirely used by the first generator module 102. In some exemplary embodiments, the gearbox module 103 may determine the inherent resistance that must be overcome to rotate the set of blades 101. For example, and without limiting the scope of the present invention, if the second gear box 109 disengages the second generator module 104, the set of blades 101 may only need to overcome a baseline resistance to rotate. In some exemplary embodiments, the baseline resistance to rotate the set of blades 101 is the minimum resistance that must be overcome. In some exemplary embodiments, a windspeed of 12 km/h may be an ideal minimum windspeed to overcome the baseline resistance. In some exemplary embodiments, the resistance to rotate the set of blades 101 may be increased when the second gearbox 109 engages the second generator module 104. In some exemplary embodiments, the resistance to rotate the set of blades 101 may require a windspeed that exceeds a threshold windspeed. In some exemplary embodiments, the threshold windspeed may be 90 km/h. For example, and without limiting the scope of the present invention, a windspeed exceeding 90 km/h may be required to engage the second generator module 104.

In some exemplary embodiments, a controller module 105 may be utilized to monitor the windspeed. In some exemplary embodiments, a controller module 105 may include various components, including a controller and a plurality of sensors. For example, and without limiting the scope of the present invention, the controller module 105 may include at least two sensors that are situated at various heights with at least one of the sensors situated at the top of a mast of the wind turbine system 100. In some exemplary embodiments, the sensors may continuously measure windspeed and relay windspeed data via electronic transmission through the controller module 105. In some exemplary embodiments, the sensors may be anemometers. In some exemplary embodiments, the sensors may be situated within a wind turbine in accordance with the present invention. In some exemplary embodiments, the sensors may also monitor a number of other factors including, but not limited to, vibrations, temperature, and structural stress in system 100. In some exemplary embodiments, the controller module 105 may be coupled to the gearbox module 103 and may be adapted to control engagement of the gearbox module 103 based on the windspeed exceeding the threshold windspeed. In some exemplary embodiments, the controller module 105 may be further adapted to continuously adjust engagement of the gearbox module 103 based on the windspeed. In some exemplary embodiments, the controller module 105 may be adapted to engage the gearbox module 103 when the windspeed exceeds a threshold windspeed and to disengage the gearbox module 103 when the windspeed is below the threshold windspeed.

In some exemplary embodiments, the controller may be adapted to shut down system 100 for maintenance purposes. In some exemplary embodiments, the controller may be adapted to shut down system 100 when the sensors detect certain conditions of system 100. For example, and without limiting the scope of the present invention, the controller may shut down system 100 when the sensors detect unfavorable levels of vibration in the gearbox module 103.

In some exemplary embodiments, the controller module 105 may be coupled to the second gearbox 109 and may be adapted to engage or disengage the second gearbox 109 based on the windspeed. In some exemplary embodiments, when the second gearbox 109 is engaged, the mechanical energy available in the wind turbine system 100 is greater than what would be available when the second gearbox 109 is not engaged. In some exemplary embodiments, the mechanical energy that is available in the wind turbine system 100 may be distributed between the first generator module 102 and the second generator module 104. In some exemplary embodiments, the transfer of mechanical energy to the first generator module 102 and the second generator module 104 is facilitated by the gearbox module 103.

In some exemplary embodiments, the first gearbox 108 may be adapted to engage the first rotor 106 and the second rotor 110. In some exemplary embodiments, the gearbox module 103 may include multiple gear shafts. In some exemplary embodiments, the first gearbox 108 may be adapted to engage the first rotor 106 through a first gear shaft and to engage the second rotor 110 through a second gear shaft. In some exemplary embodiments, the first gear shaft may be a horizontal gear shaft. In some exemplary embodiments, the second gear shaft may be a vertical gear shaft. In some exemplary embodiments, the first gear shaft and the second gear shaft may be oriented perpendicularly with respect to one another.

In some exemplary embodiments, which will be discussed in more detail below, the second generator module 104 may include various components, including a second rotor 110, a second generator 111, and a magnetic assembly 112. In some exemplary embodiments, the magnetic assembly 112 may include a plurality of electromagnets adapted to emit a magnetic field. In some exemplary embodiments, the plurality of magnets may be made with various materials known to those of ordinary skilled in the art. For example, and without limiting the scope of the present invention, the magnetic assembly 112 may include a plurality of neodymium magnets.

In some exemplary embodiments, the magnetic assembly 112 is adapted to spin across a stationary set of coiled wires along the mast of a wind turbine in accordance with the present invention when engaged by the second rotor 110. In some exemplary embodiments, the magnetic assembly 112 may be stationary and the set of coiled wires may be adapted to spin across the magnetic assembly 112.

Figure 2:
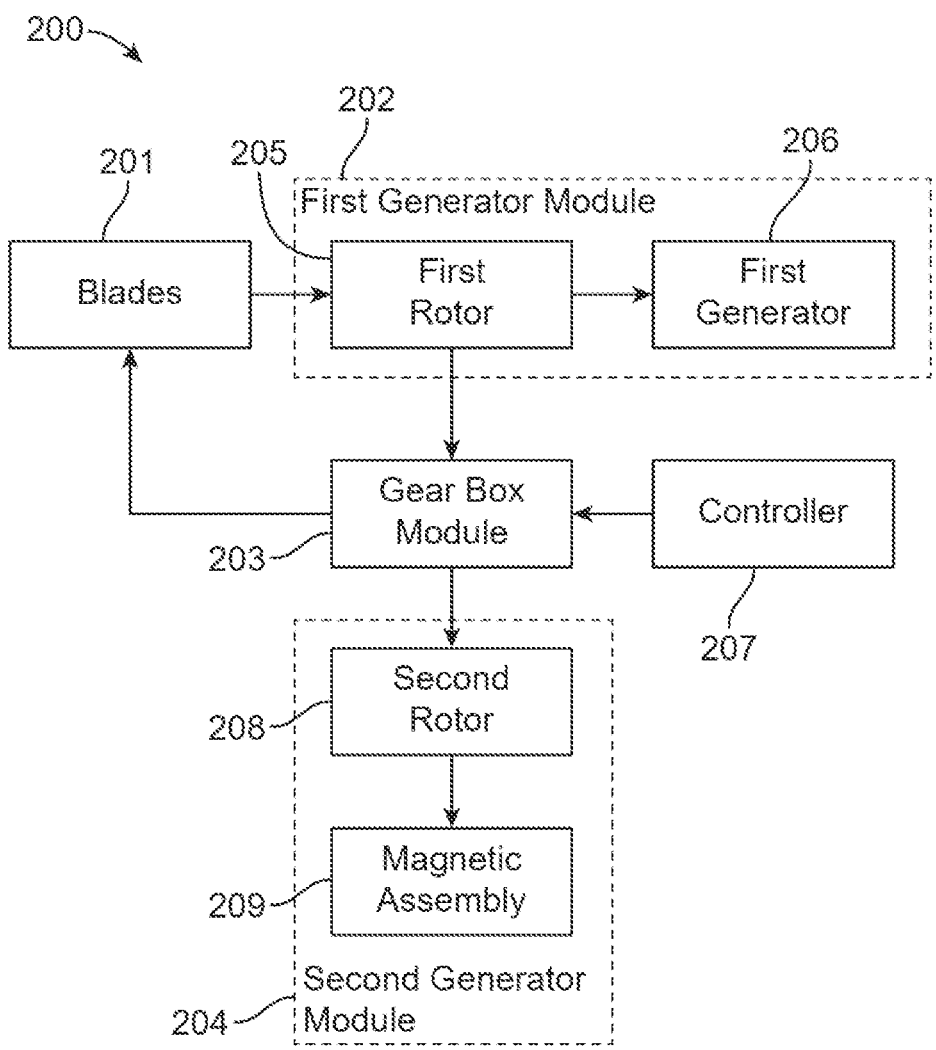
FIG. 2 illustrates a block diagram in accordance with some exemplary embodiments of the present invention.

FIG. 2 depicts a block diagram of another exemplary wind turbine system 200 in accordance with the present invention. Similar to system 100 of FIG. 1, the block diagram of FIG. 2 depicts a system 200, which may include a set of blades 201, a first generator module 202, a gearbox module 203, a controller module 205, and a second generator module 204. In some exemplary embodiments, as depicted by the block diagram in FIG. 2, the second generator module 204 may not require a separate generator. In some exemplary embodiments, the mast of a wind turbine system 200 may operate as a generator in addition to the structural support the mast provides.

Similar to the set of blades 101 of system 100 depicted by FIG. 1, the set of blades of system 200 may be adapted to rotate on an axis. In some exemplary embodiments, the set of blades 201 made be adapted to rotate about a horizontal axis.

In some exemplary embodiments, which will be discussed in more detail below, the first generator module 202 may include various components, including a first rotor 205 and a first generator 206. In some exemplary embodiments, the set of blades 201 may be coupled to a first rotor 205 which, in turn, may be coupled to a first generator 206. In some exemplary embodiments, the first generator module 202 is disposed within a housing situated at the top of the wind turbine directly above the mast of the wind turbine. In other exemplary embodiments, the first rotor 205 may be coupled to a first generator 206 through the gearbox module 203.

In some exemplary embodiments, the kinetic energy from the wind that rotates the set of blades 201 may be converted into mechanical energy which, in turn, may rotate a first rotor 205 coupled to the set of blades 201. In some exemplary embodiments, the mechanical energy of the first rotor 205 may be a low speed, high torque rotational force. In some exemplary embodiments, the first rotor 205 may be coupled to a gearbox module 203 and may transfer the rotational energy from the set of blades 201 to the gearbox module 203. In some exemplary embodiments, the gearbox module 203 may transform the mechanical energy from the high torque, low speed rotational energy of the first rotor 205 to a high speed, low torque rotational output necessary to generate electricity.

In some exemplary embodiments, the gearbox module 203 may include multiple gearboxes. In other exemplary embodiments, the gearbox module 203 may include only a single gearbox. In some exemplary embodiments, the gearbox module 203 may include multiple gear shafts. In some exemplary embodiments, the gearbox module 203 may be adapted to selectively engage the second generator module 204 when a windspeed exceeds a threshold windspeed. When the windspeed does not exceed the threshold windspeed, the gearbox module 203 may be adapted to disengage the second generator module 204 and the mechanical energy available in system 200 is used entirely by the first generator module 202. In some exemplary embodiments, the gearbox module 203 may determine the inherent resistance that must be overcome to rotate the set of blades 201. For example, and without limiting the scope of the present invention, if the gearbox module 203 disengages the second generator module 204, the set of blades 201 may only need to overcome a baseline resistance to rotate. In some exemplary embodiments, a windspeed of 12 km/h may be an ideal minimum windspeed to overcome the baseline resistance. In some exemplary embodiments, the resistance to rotate the set of blades 201 may be increased when the gearbox module 203 engages the second generator module 204.

In some exemplary embodiments, the second generator module 204 utilizes the mast of a wind turbine as a second generator. For example, and without limiting the scope of the present invention, the second generator module 204 may utilize the entirety of the mast of the wind turbine system 200 as a conduit for a second generator module 204 in lieu of a generator. In some exemplary embodiments, the mast functions as a generator for the second generator module 204 without diminishing the structural integrity of the wind turbine.

Similar to the controller module 105 of system 100, the controller module 207 of the system 200 may be adapted to monitor the windspeed. In some exemplary embodiments, the controller module 207 may include various components, including a controller and a plurality of sensors. In some exemplary embodiments, the controller module 105 may be coupled to the gearbox module 203 and may be adapted to control engagement of the gearbox module 203 based on the windspeed exceeding the threshold windspeed. In some exemplary embodiments, the controller module 207 may be further adapted to continuously adjust engagement of the gearbox module 203 based on the windspeed. In some exemplary embodiments, the controller module 207 may be adapted to engage the gearbox module 203 when the windspeed exceeds a threshold windspeed and to disengage the gearbox module 203 when the windspeed is below the threshold windspeed.

In some exemplary embodiments, which will be discussed in more detail below, the second generator module 204 may include various components, including a second rotor 208 and a magnetic assembly 209. In some exemplary embodiments, the magnetic assembly 209 may include a plurality of electromagnets adapted to emit a magnetic field. In some exemplary embodiments, the plurality of electromagnets may be made with various materials known to those of ordinary skill in the art. For example, and without limiting the scope of the present invention, the magnetic assembly 209 may include a plurality of neodymium magnets.

Figure 3:
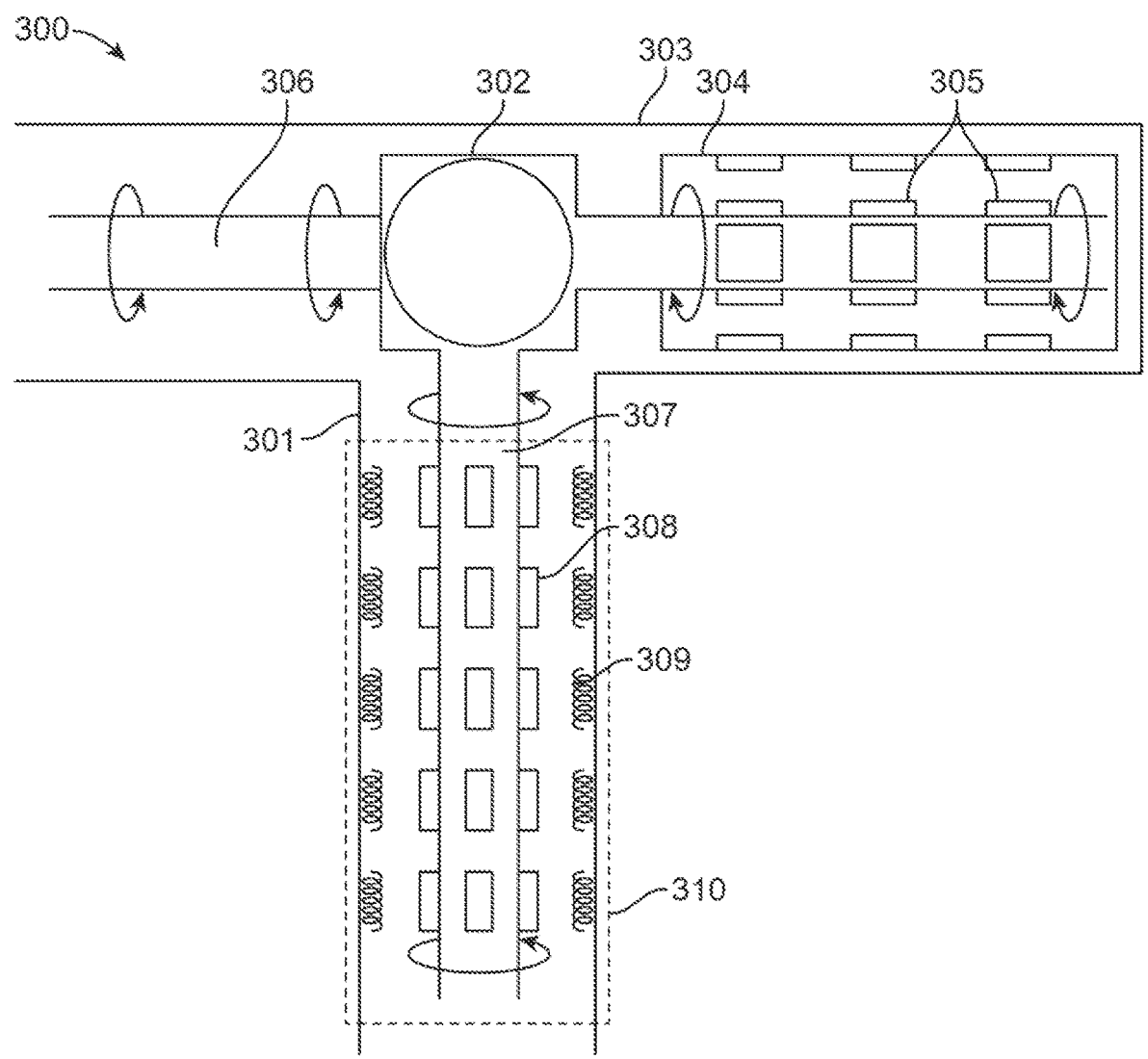
FIG. 3 illustrates a perspective view of a wind turbine in accordance with the present invention.

FIG. 3 depicts a perspective view of a wind turbine system in accordance with the present invention. More specifically, FIG. 3 depicts one embodiment of system 300, which includes a housing 303 that at least partially encloses a gearbox module 302 and a first generator module 304 of system 300 and a mast 301 that houses a second generator module of system 300. In some exemplary embodiments, the first generator module 304 is situated in a housing 303. In some exemplary embodiments, the housing 303 is located at the top of the wind turbine.

In some exemplary embodiments, as depicted in FIG. 3, the first generator module 304 of system 300 may include a first rotor 306, an arrangement of magnets 305, and a first generator 304 that is enclosed within a housing 303. In some exemplary embodiments, as depicted in FIG. 3, the first rotor 306 may be adapted to rotate about a horizontal axis. In some exemplary embodiments, the first generator 304 may enclose a portion of the first rotor 306 and the arrangement of magnets 305. In some exemplary embodiments, the first generator module 304 is adapted to receive the high torque, low speed mechanical energy from the first rotor 306 as a low torque, high speed rotational energy through the gearbox module 302 to generate electricity. In some exemplary embodiments, the first generator module 304 is adapted to utilize the low torque, high speed rotational energy from the gearbox module 302 to spin the arrangement of magnets 305 to generate electricity.

In some exemplary embodiments, as depicted in FIG. 3, the mast 301 of a wind turbine system 300 extends from the housing 303. In some exemplary embodiments, the first rotor 306 transfers the low speed, high torque mechanical energy of system 300 into the gearbox module 302. In some exemplary embodiments, the gearbox module 302 converts the low speed, high torque mechanical energy of the first rotor into a low torque, high speed rotational force utilized by a first generator module 304 and a second generator module 310. In some exemplary embodiments, the gearbox module 302 transfers the high torque, low speed rotational force of a second rotor 307 to a low torque, high speed rotational force utilized by the second generator module 310.

In some exemplary embodiments, as depicted in FIG. 3, the interior of the mast may be adapted to house a second generator module 310 that would allow a wind turbine system 300 in accordance with the present invention to generate more electricity than would be generated from a traditional wind turbine system. The mast 301 that has traditionally only been used for structural support may be utilized as a conduit for the electrical conduction of a second generator module 310. In some exemplary embodiments, as depicted by FIG. 3, the mast 301 is adapted to act as a conduit for the second generator module 310 in lieu of a generator. In some exemplary embodiments, as depicted by FIG. 3, a magnetic assembly 308 may be situated along an outer wall of a second rotor 307. In some exemplary embodiments, the second rotor 307 is adapted to rotate when engaged by the gearbox module 302. In some exemplary embodiments, the magnetic assembly 308 is adapted to rotate when the second rotor 307 rotates. In some exemplary embodiments, as depicted by FIG. 3, a set of coiled wires 309 is situated along a wall of the mast 301. In some exemplary embodiments, a magnetic assembly 308 may be adapted to induce an electrical current through a stationary set of coiled wires 309 situated along a wall of the mast 301 as the magnetic assembly 308 spins. In some exemplary embodiments, the magnetic assembly 308 includes a plurality of magnets. In some exemplary embodiments, the magnetic assembly 308 includes a plurality of neodymium magnets. In some exemplary embodiments, as depicted by FIG. 3, a gap exists therebetween the magnetic assembly 308 and the set of coiled wires 309.

Figure 4:
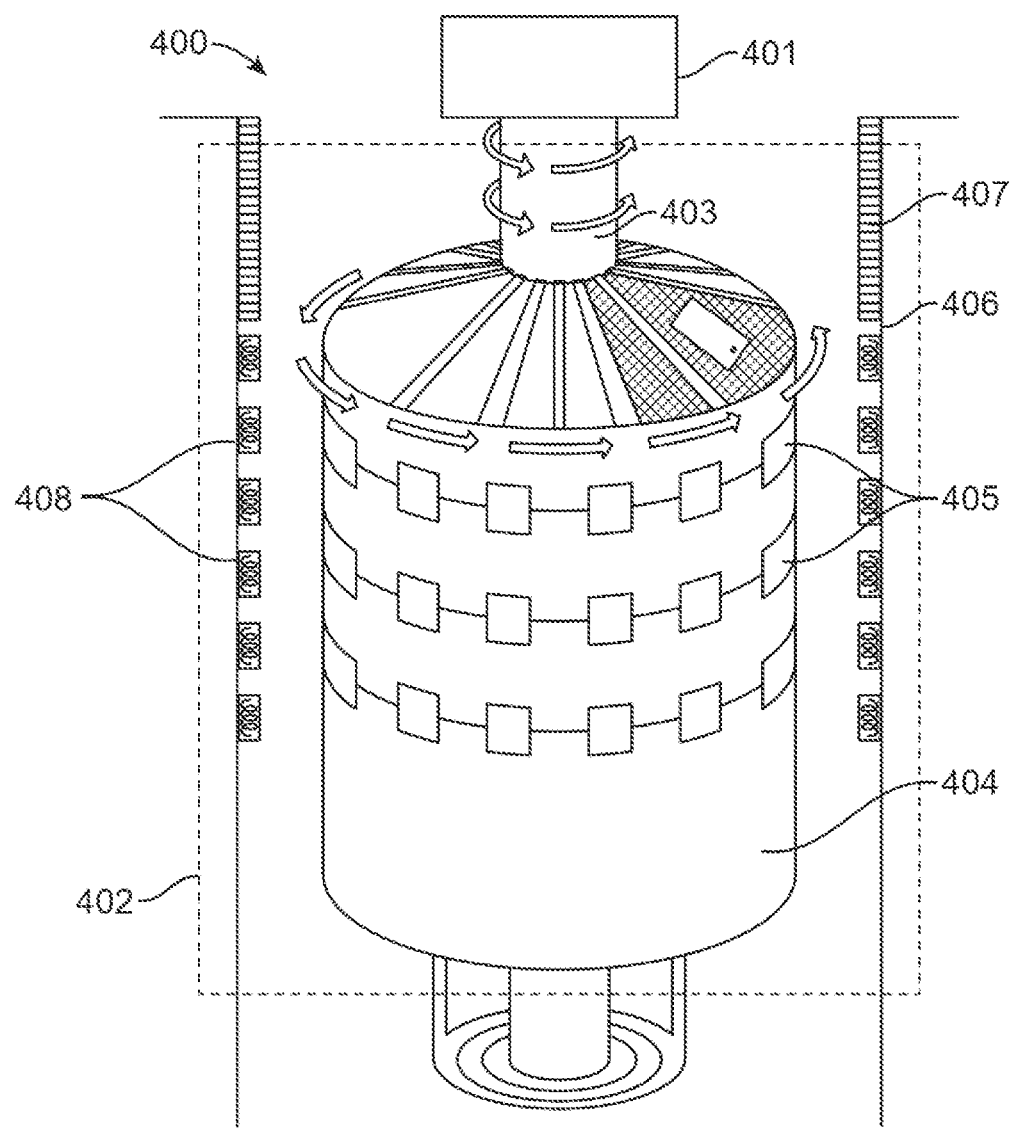
FIG. 4 illustrates a perspective view of an exemplary embodiment of a second generator module of a wind turbine system in accordance with the present invention.

FIG. 4 depicts a perspective view of the interior of a second generator module 400 of an exemplary embodiment of a wind turbine system in accordance with the present invention. More specifically, FIG. 4 depicts one embodiment of a wind turbine system in accordance with the present invention, which includes a gearbox module 401 and a second generator module 402 situated within the mast 406. In some exemplary embodiments, the second generator module 402 includes a second rotor 403, a second generator 404, a magnetic assembly 405, and the mast 406.

In some exemplary embodiments, the second rotor 403 extends from the gearbox module 401 to the bottom of the wind turbine. In some exemplary embodiments, the second generator 404 is cylindrical and oriented about a longitudinal axis. In some exemplary embodiments, the second rotor 403 is coupled to the second generator 404. In some exemplary embodiments, the second rotor 403 and the second generator 404 share the same longitudinal axis and the second rotor 403 passes through the center of the second generator 404. In some exemplary embodiments, the second generator 404 is adapted to physically attach to the second rotor 403 by a plurality of structural attachments as depicted in FIG. 4. In some exemplary embodiments, a magnetic assembly 405 is coupled to the second generator 404. In some exemplary embodiments, the magnetic assembly 405 includes a plurality of magnets situated along an outer wall of the second generator 404. In some exemplary embodiments, the plurality of magnets is uniformly arranged. In some exemplary embodiments, the plurality of magnets may consist of neodymium magnets. In some exemplary embodiments, as depicted by FIG. 4, the second rotor 403 and the second generator 404 are adapted to rotate about the same longitudinal axis. In some exemplary embodiments, the second rotor 403 is adapted to rotate by the low torque, high speed output from the gearbox module 401. In some exemplary embodiments, the second generator 404 is adapted to rotate when the second rotor 403 rotates. In some exemplary embodiments, the magnetic assembly 405 is adapted to rotate when the second generator 404 rotates. In some exemplary embodiments, the magnetic assembly 405 is adapted to generate a magnetic field that also rotates when the magnetic assembly 405 rotates. In some exemplary embodiments, the magnetic assembly 405 is adapted to induce a current across a set of coiled wires 408. In some exemplary embodiments, a set of coiled wires 408 are situated along the inner wall of the mast 406 of a wind turbine system in accordance with the present invention. In some exemplary embodiments, as depicted in FIG. 4, the set of coiled wires 408 are symmetrically arranged. In some exemplary embodiments, the set of coiled wires 408 facilitates the rotation of the magnetic field.

In some exemplary embodiments, a wind turbine system 400 in accordance with the present invention may include a ladder 407 with built-in steps. In some exemplary embodiments, the ladder 407 is mounted along the inner wall of the mast 406. In some exemplary embodiments, the ladder 407 may be mounted to the wall using magnets. In some exemplary embodiments, the ladder 407 extends from the base to the top of a wind turbine in accordance with the present invention. For example, and without limiting the scope of the present invention, the ladder 407 may be accessible from the base of the wind turbine to provide a convenient access point and the ladder 407 may extend to the top of the wind turbine to allow access to different components of the wind turbine system 400 for various purposes including, but not limited to, maintenance and repair.

Figure 5:
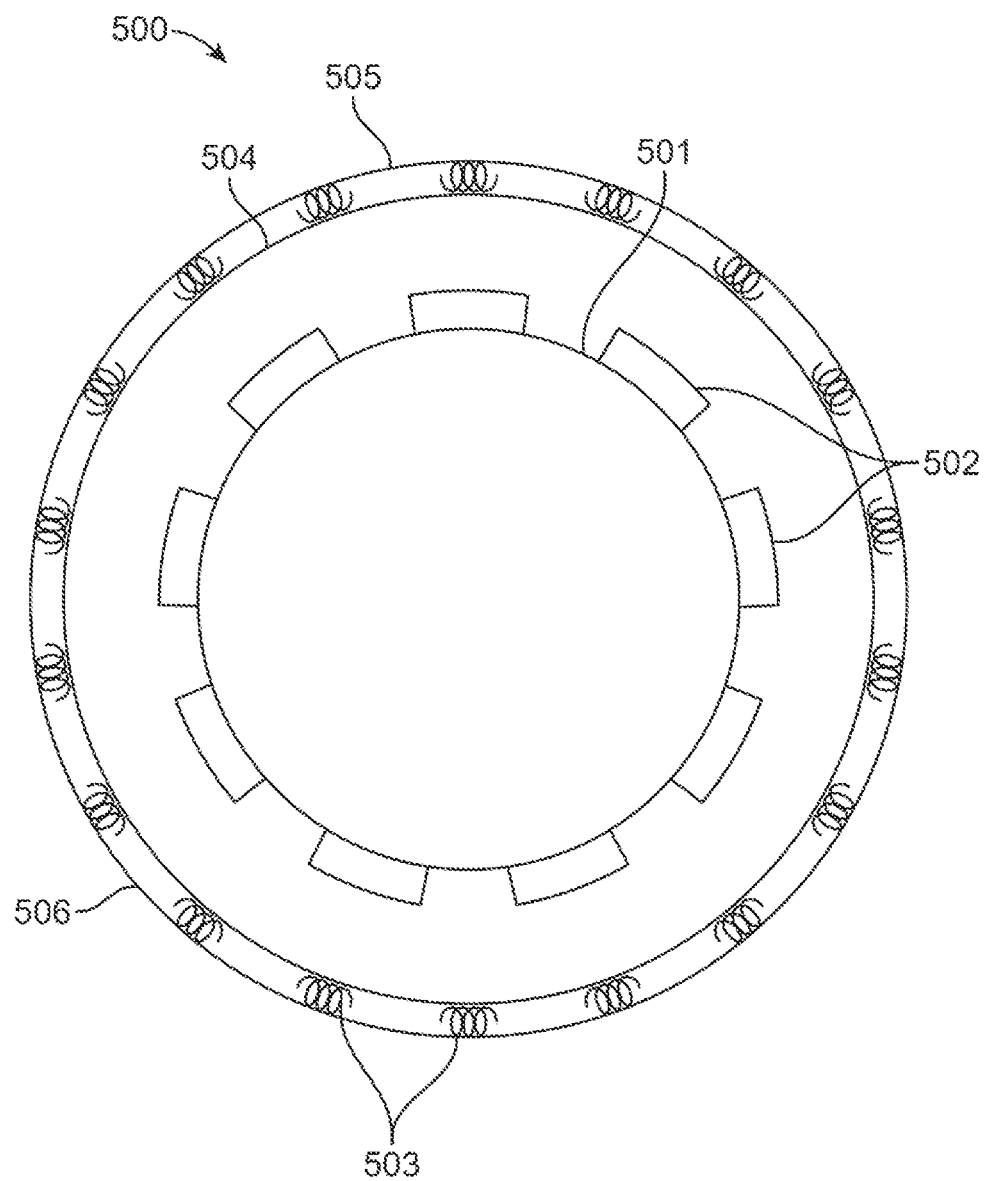
FIG. 5 illustrates a top-down cross-sectional view of a second generator module of a wind turbine system in accordance with some exemplary embodiments of the present invention.
Figure 6:
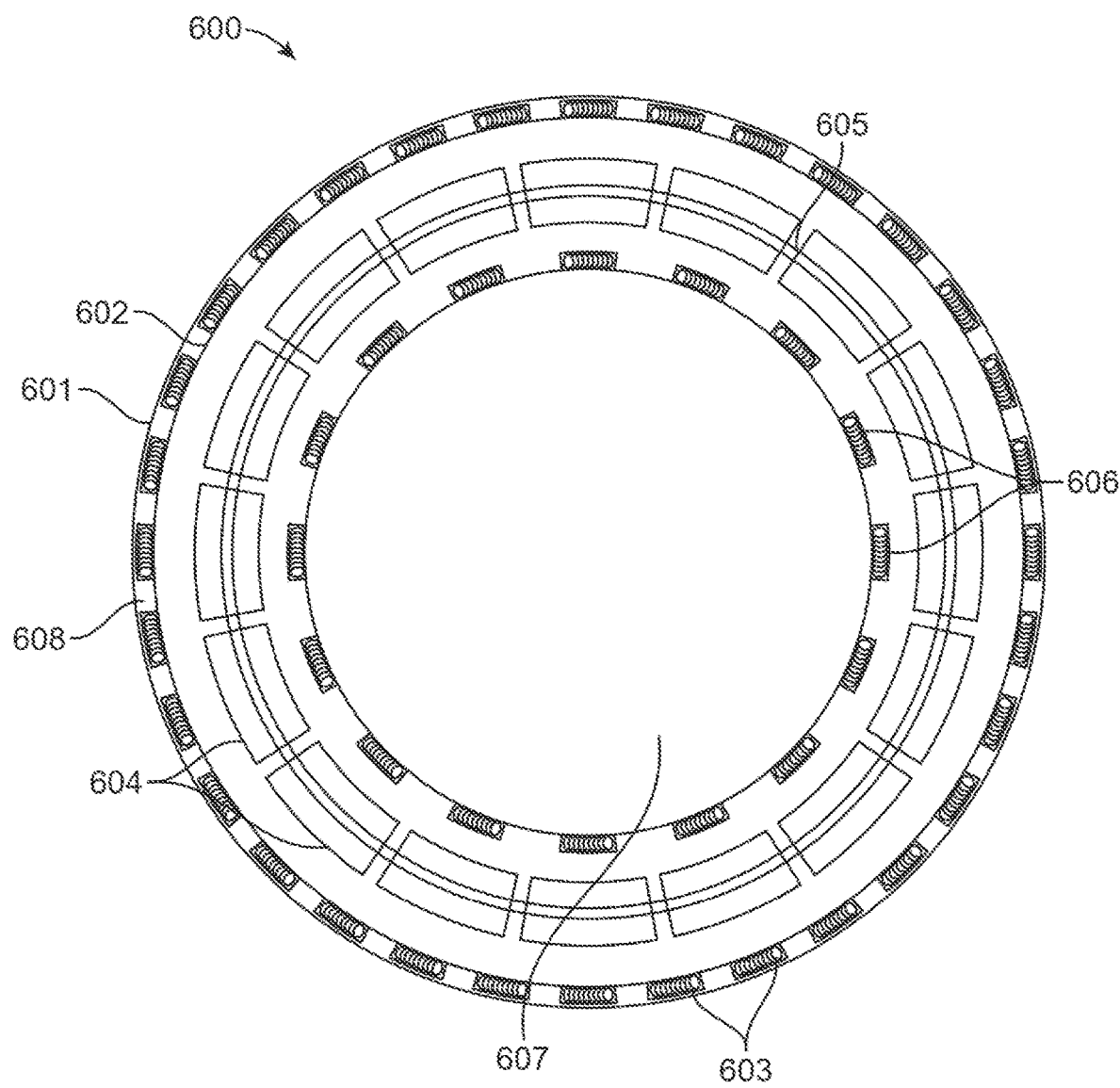
FIG. 6 illustrates a top-down cross-sectional view of a second generator module of a wind turbine in accordance with some exemplary embodiments of the present invention.

FIG. 5 and FIG. 6 depict a top-down cross-sectional view of a second generator module of a wind turbine system in accordance with the present invention. More specifically, FIG. 5 depicts one embodiment of a wind turbine system in accordance with the present invention, wherein the second generator module 500 utilizes the mast of a wind turbine as a second generator. For example, and without limiting the scope of the present invention, the second generator module 500 may utilize the entirety of the mast of the wind turbine system as a conduit for a second generator module 500 in lieu of a generator. In some exemplary embodiments, the mast functions as a generator for the second generator module 500 without diminishing the structural integrity of the wind turbine.

In some exemplary embodiments, as depicted in FIG. 5, the second generator module 500 includes a magnetic assembly 502 disposed within the enclosed space of the inner wall 504 of the mast. In some exemplary embodiments, the magnetic assembly 502 may be situated along an outer wall of a second rotor 501 of a wind turbine system in accordance with the present invention, as depicted in FIG. 5. In some exemplary embodiments, the magnetic assembly 502 may include a plurality of magnets. In some exemplary embodiments, the plurality of magnets may be situated along an outer wall of a second rotor 501 in a uniform cylindrical arrangement. In some exemplary embodiments, the mast of a second generator module 500 of a wind turbine system in accordance with the present invention includes an inner mast wall 504 and an outer mast wall 505 defining an inner volume 506 therebetween. In some exemplary embodiments, the inner volume 506 may be adapted to house a set of coiled wires 503, wherein the set of coiled wires 503 may be adapted to have a voltage induced in them by the magnetic assembly 502. In some exemplary embodiments, the set of coiled wires 503 may be uniformly distributed throughout the inner volume 506 of the mast. In some exemplary embodiments, the set of coiled wires 503 may be arranged cylindrically within the inner volume 506 of the mast of a wind turbine.

FIG. 6 depicts another embodiment of a wind turbine system in accordance with the present invention including a structural support 605 and a central housing 607. In some exemplary embodiments, the structural support 605 may be adapted to rotate about a longitudinal axis and may be coupled to a magnetic assembly 604. In some exemplary embodiments, a second generator module 600 of a wind turbine system in accordance with the present invention includes an inner mast wall 602 and an outer mast wall 601 defining an inner volume 608 therebetween, wherein the inner volume 608 may be adapted to house a first set of coiled wires 603.

In some exemplary embodiments, the central housing 607 of the second generator module 600 is situated within a mast and may be adapted to at least partially house a second rotor. In some exemplary embodiments, the central housing 607 and the second rotor may share a longitudinal axis. In some exemplary embodiments, the central housing 607 may include various components and configurations to maximize the efficiency of the second generator module 600. For example, and without limiting the scope of the present invention, the central housing 607 may be configured as a stationary cylindrical structure situated within the mast of a wind turbine in accordance with the present invention. In some exemplary embodiments, the circumference of the central housing 607 is greater than the circumference of the second rotor. In some exemplary embodiments, as depicted by FIG. 6, the circumference of the structural support 605 is greater than the circumference of the central housing 607. In some exemplary embodiments, a second set of coiled wires 606 may be situated along the outer wall of the central housing 607. In some exemplary embodiments, the central housing 607 may be hollow.

In some exemplary embodiments, the structural support 605 may be coupled to a second rotor by a set of structural attachments. In some exemplary embodiments, the structural support 605 may be adapted to rotate when the second rotor rotates. In some exemplary embodiments, the magnetic assembly 604 may be coupled to the structural support 605. In some exemplary embodiments, the magnetic assembly 604 may be adapted to spin and to induce an electric current across both sets of coiled wires 606, 603 as the second rotor rotates. In some exemplary embodiments, the weight of the structural support 605 along with its inherent friction may determine the amount of resistance that must be overcome to rotate a set of blades of a wind turbine system in accordance with the present invention. For example, and without limiting the scope of the present invention, the inherent resistance that must be overcome to rotate the set of blades may increase as the weight of the structural support 605 increases. In some exemplary embodiments, the weight of the structural support 605 along with the inherent friction at the bottom of the structural support 605 may determine the resistance experienced by the set of blades of a wind turbine system in accordance with the present invention.

Figure 7:
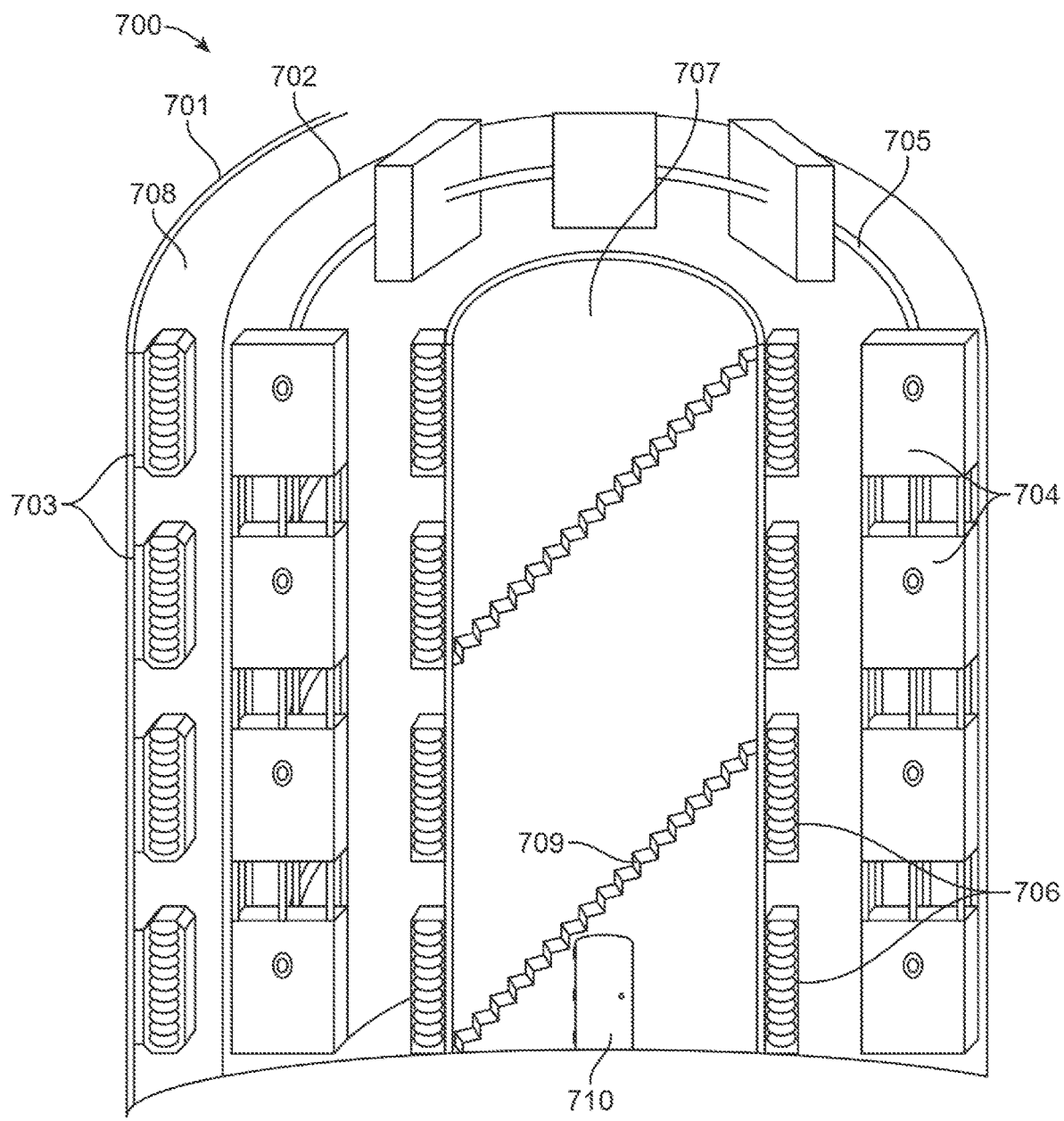
FIG. 7 illustrates a cross-sectional perspective view of a second generator module of a wind turbine system in accordance with some exemplary embodiments of the present invention.

FIG. 7 depicts a cross-sectional perspective view of a second generator module 700 of a wind turbine system in accordance with the present invention. In some exemplary embodiments, the second generator module 700 includes a structural support 705 and a central housing 707. In some exemplary embodiments, the structural support 705 includes a magnetic assembly 704. In some exemplary embodiments, the central housing 707 may include various components and configurations to maximize the efficiency of the second generator module 700. For example, and without limiting the scope of the present invention, the central housing 707 may be configured as a stationary cylindrical structure with a second set of coiled wires 706 situated along its outer wall. In some exemplary embodiments, the central housing 707 may be hollow.

In some exemplary embodiments, as depicted in FIG. 7, the hollow space within the central housing 707 may be utilized to house a set of stairs 709 that extend from the base of the wind turbine to the top of the wind turbine. In some exemplary embodiments, as depicted by FIG. 7, the hollow space within the central housing 707 may be accessed through a door 710 at the floor-level of a wind turbine system in accordance with the present invention.

In some exemplary embodiments, the structural support 705 may be adapted to rotate about a longitudinal axis and may be coupled to a magnetic assembly 704. In some exemplary embodiments, the structural support 705 is coupled to the second rotor of a wind turbine system in accordance with the present invention. In some exemplary embodiments, the structural support 705 and the magnetic assembly 704 may be adapted to rotate about the longitudinal axis when the second rotor rotates.

In some exemplary embodiments, a second generator module 700 of a wind turbine system in accordance with the present invention includes an inner mast wall 702 and an outer mast wall 701 defining an inner volume 708 therebetween, wherein the inner volume 708 may be adapted to house a first set of coiled wires 703. In some exemplary embodiments, the first set of coiled wires 703 may be uniformly distributed within the inner volume 708 of the mast. In some exemplary embodiments, the first set of coiled wires 703 may be disposed within the inner volume 708 in a cylindrical arrangement. In some exemplary embodiments, each coiled wire from the first set of coiled wires 703 may be individually housed within a protective enclosure.

Similarly, in some exemplary embodiments, the second set of coiled wires 706 may be uniformly situated along the outer wall of a central housing 707. Furthermore, in some exemplary embodiments, the second set of coiled wires 706 may also be individually housed within a protective enclosure.

In some exemplary embodiments, as depicted by FIG. 7, the magnetic assembly 704 may be coupled to the structural support 705. In some exemplary embodiments, the magnetic assembly 704 includes a plurality of electromagnets. In some exemplary embodiments, the plurality of magnets may be comprised of various materials known to those of ordinary skill in the art. For example, and without limiting the scope of the present invention, the magnetic assembly 704 may include a plurality of neodymium magnets. In some exemplary embodiments, as depicted in FIG. 7, the plurality of magnets is uniformly spaced and each magnet may be physically attached to its adjacent magnets by a set of struts. In some exemplary embodiments, the magnetic assembly 704 may be adapted to induce an electric current across the two sets of coiled wires 703, 706 as the magnetic assembly 704 rotates.

In some exemplary embodiments, the weight of the structural support 705 along with its inherent friction may determine the amount of resistance that must be overcome to rotate a set of blades of a wind turbine system in accordance with the present invention. For example, and without limiting the scope of the present invention, the resistance of the set of blades may increase as the weight of the structural support 705 increases in some exemplary embodiments.

Figure 8:
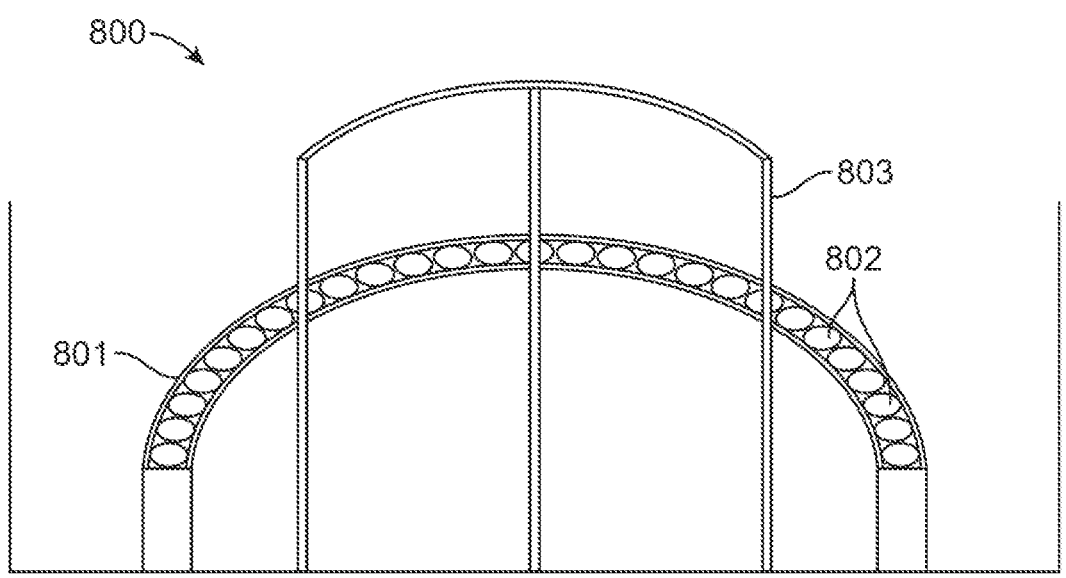
FIG. 8 illustrates a cross-sectional perspective view of a base structure of a wind turbine system in accordance with one embodiment of the present invention.

FIG. 8 depicts a cross-sectional perspective view of a base structure 800 of a wind turbine system in accordance with one embodiment of the present invention. In some exemplary embodiments, the base structure 800 may include an arrangement of structural attachments 803 and a rail 801 with a plurality of ball bearings 802. In some exemplary embodiments, a circular arrangement of structural attachments 803 may be utilized to support a stationary central housing of a wind turbine system in accordance with the present invention.

In some exemplary embodiments, the rail 801 may be cylindrical. In some exemplary embodiments, plurality of ball bearings 802 may be situated within the rail 801 in a circular arrangement. In some exemplary embodiments, the arrangement of structural attachments 803 extends from the base of a wind turbine system in accordance with the present invention and above a rail 801 with a plurality of ball bearings 802. In some exemplary embodiments, a structural support may sit atop the rail 801 with a plurality of ball bearings 802. In some exemplary embodiments, a plurality of ball bearings 802 may support the weight of a rotating structural support while minimizing the inherent friction created as the structural support rotates atop the plurality of ball bearings 802.

In some exemplary embodiments, the top of the rail 801 may be exposed, allowing direct contact between the structural support and the plurality of ball bearings 802. In some exemplary embodiments, the plurality of ball bearings 802 are sized and arranged within a rail 801 to fit snugly within the groove of the rail 801. In some exemplary embodiments, the plurality of ball bearings 802 may be uniformly spaced and held in a circular arrangement by the design of the rail 801 itself, which ensures that each ball bearing remains in contact with its adjacent ball bearing in a single circular row. In some exemplary embodiments, the plurality of ball bearings 802 may be adapted to evenly distribute the weight of a spinning structural support of a wind turbine system in accordance with the present invention to allow for high load-carrying capacity, to maximize stability, and to minimize friction.

Figure 9:
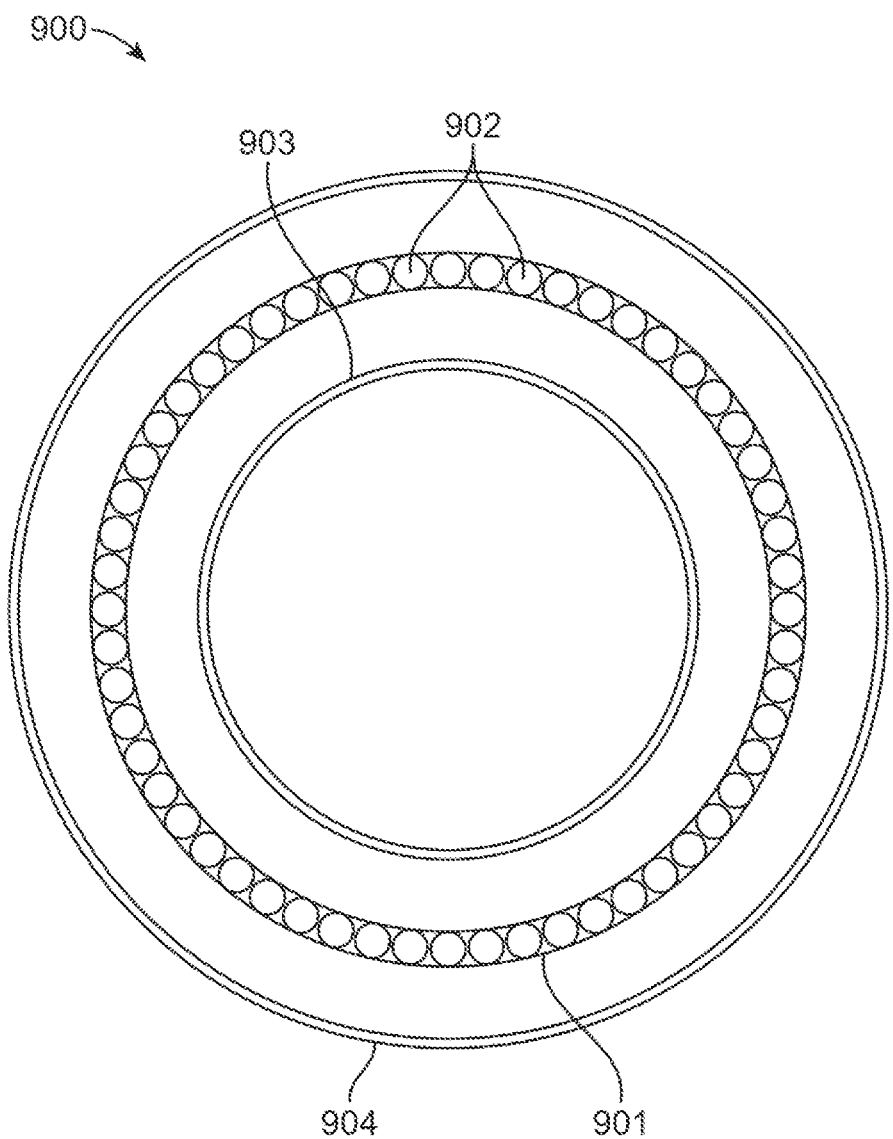
FIG. 9 illustrates a top-down cross-sectional view of a base structure of a wind turbine system in accordance with one embodiment of the present invention.

FIG. 9 depicts a top-down cross-sectional view of a base structure 900 of a wind turbine system in accordance with one embodiment of the present invention. In some exemplary embodiments, a base structure 900 of a wind turbine system in accordance with the present invention includes a rail 901 with a plurality of ball bearings 902 and an arrangement of structural attachments 903 within the mast 904, as depicted in FIG. 9. In some exemplary embodiments, the rail 901 with a plurality of ball bearings 902 and the arrangement of structural attachments 903 are concentrically arranged. In some exemplary embodiments, as depicted in FIG. 9, a gap exists therebetween the circumferences of the rail 901 and the arrangement of structural attachments 903. In some exemplary embodiments, as depicted by FIG. 9, the circumference of the rail 901 is greater than the circumference of the arrangement of structural attachments 903. In some exemplary embodiments, as depicted by FIG. 9, the circumference of the mast 904 is greater than the circumference of the rail 901. In some exemplary embodiments, the mast 904, the arrangement of structural attachments 903, and the rail 901 share the same center point. In some exemplary embodiments, the plurality of ball bearings 902 may include precision ball bearings adapted to support the weight of a spinning support structure while decreasing the friction of a rotating structural support to maximize electricity production.

Figure 10:
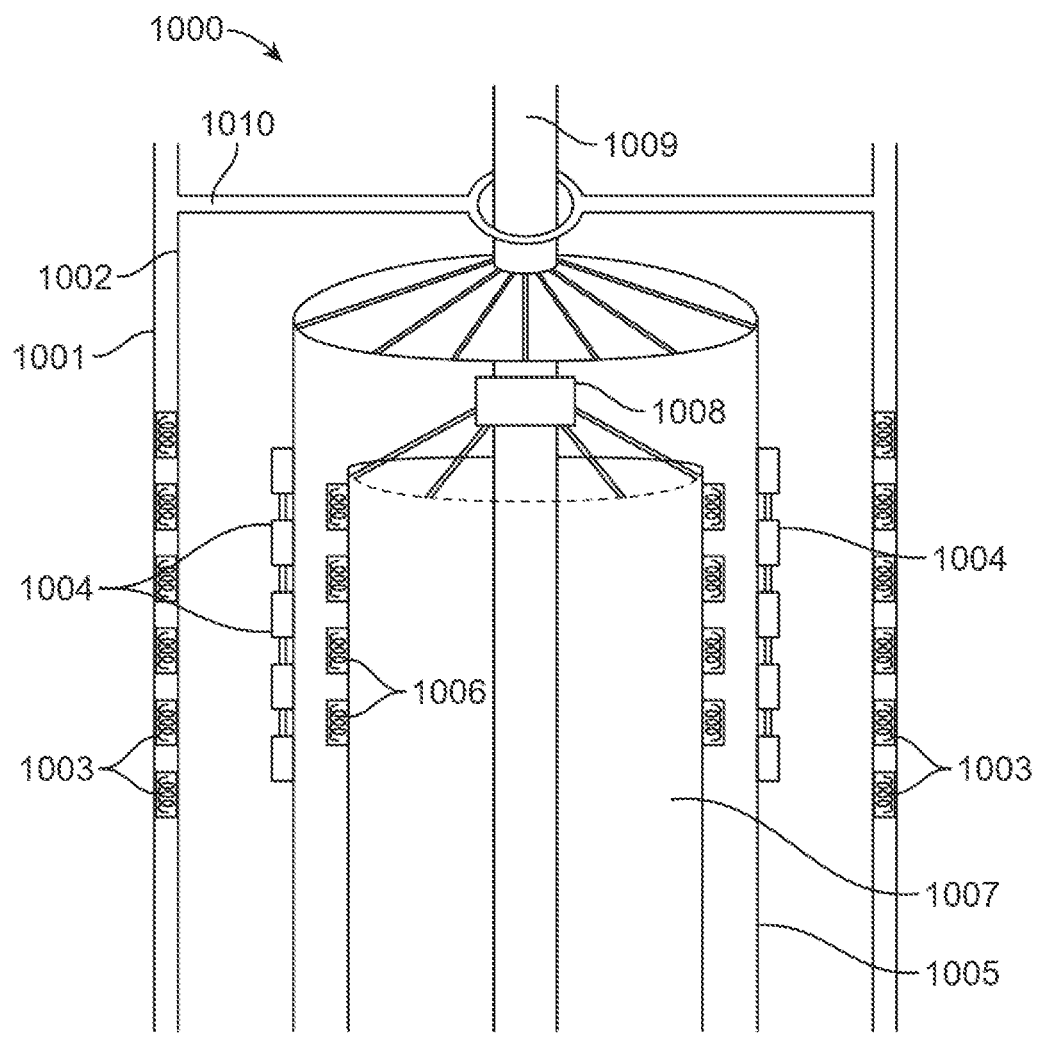
FIG. 10 illustrates a perspective view of a second generator module of a wind turbine system in accordance with one embodiment of the present invention.

FIG. 10 depicts a perspective view of a second generator module 1000 of a wind turbine system in accordance with the present invention. In some exemplary embodiments, the second generator module 1000 includes a structural support 1005, a central housing 1007, and a reduction gearbox 1008. In some exemplary embodiments, the structural support 1005 may be coupled to a second rotor 1009 and adapted to rotate about a vertical axis. In some exemplary embodiments, the second rotor 1009 may have an upper portion that is adapted to rotate and a lower portion that is adapted to remain stationary. In some exemplary embodiments, the structural support 1005 may be coupled to the upper portion of the second rotor 1009. In some exemplary embodiments, the central housing 1007 may be coupled to the lower portion of a second rotor 1009 and may be stationary. In some exemplary embodiments, the central housing 1007 may be coupled to the non-rotating lower portion of the second rotor 1009.

In some exemplary embodiments, the structural support 1005 is adapted to rotate as the second rotor 1009 rotates. In some exemplary embodiments, a second generator module 1000 of a wind turbine system in accordance with the present invention includes an inner mast wall 1002 and an outer mast wall 1001 defining an inner volume therebetween, wherein the inner volume may be adapted to house a first set of coiled wires 1003. In some exemplary embodiments, the central housing 1007 may be situated within the inner mast wall 1002 and may be adapted to at least partially house a second rotor 1009. In some exemplary embodiments, as depicted by FIG. 1000, the central housing 1007 may be adapted to house the non-rotating lower portion of a second rotor 1009 that extends below a reduction gearbox 1008.

In some exemplary embodiments, the reduction gearbox 1008 is situated along a second rotor between a rotating upper portion of the second rotor 1009 and a non-rotating lower portion of the second rotor 1009. In some exemplary embodiments, the reduction gearbox 1008 may be adapted to disconnect the lower portion of a second rotor 1009 from the top portion of the second rotor 1009. For example, and without limiting the scope of the present invention, the reduction gearbox 1008 may be adapted to disengage the bottom portion of the second rotor 1009 such that the lower portion of the second rotor 1009 does not rotate when the upper portion of the second rotor 1009 rotates. In some exemplary embodiments, as depicted by FIG. 10, the structural support 1005 may be coupled to the upper portion of the second rotor 1009. In some exemplary embodiments, the structural support 1005 may be coupled to a magnetic assembly 1004. In some exemplary embodiments, the magnetic assembly 1004 may include a plurality of magnets that are uniformly situated along an outer wall of the structural support 1005 in a cylindrical arrangement. In some exemplary embodiments, the magnetic assembly 1004 may include a plurality of neodymium magnets.

In some exemplary embodiments, the structural support 1005 may be adapted to rotate when the upper portion of the second rotor 1009 rotates. In some exemplary embodiments, the magnetic assembly 1004 may be adapted to rotate when the structural support 1005 rotates. In some exemplary embodiments, the magnetic assembly 1004 may be adapted to generate a rotating magnetic field as the magnetic assembly 1004 rotates.

In some exemplary embodiments, a second set of coiled wires 1006 may be situated along the outer wall of the central housing 1007. In some exemplary embodiments, the central housing 1007 may be coupled to the non-rotating lower portion of the second rotor 1009. In some exemplary embodiments, the central housing 1007 may be stationary and hollow. In some exemplary embodiments, the magnetic assembly 1004 may be adapted to rotate when the upper portion of a second rotor 1009 rotates. In some exemplary embodiments, the magnetic assembly 1004 may be adapted to induce an electric current across the two sets of coiled wires 1006, 1003 as the magnetic assembly 1004 rotates.

In some exemplary embodiments, as depicted in FIG. 10, the central housing 1007 and the structural support 1005 may be cylindrical. In some exemplary embodiments, the central housing 1007 and the structural support 1005 may share the same longitudinal axis that runs through a common center. In some exemplary embodiments, the second rotor 1009 may also be cylindrical and share the same longitudinal axis as the structural support 1005 and the central housing 1007. In some exemplary embodiments, the diameter of the structural support 1005 may be greater than the diameter of the central housing 1007 and lesser than the diameter of the inner mast wall 1002. In some exemplary embodiments, a concentric gap exists therebetween the central housing 1007 and the structural support 1005. In some exemplary embodiments, another concentric gap exists therebetween the structural support 1005 and the inner mast wall 1002.

In some exemplary embodiments, as depicted in FIG. 10, the second generator module 1000 may include a structural anchor 1010. In some exemplary embodiments, the structural anchor 1010 may include struts that are adapted to attach the second rotor 1009 to the mast wall without interfering with the rotation of the second rotor 1009. In some exemplary embodiments, as depicted in FIG. 10, the structural anchor includes a circular casing around the upper portion of the second rotor 1009. In some exemplary embodiments, as depicted in FIG. 10, the structural anchor 1010 extends along a horizontal axis that is a diameter of the inner mast wall 1002. In some exemplary embodiments, the structural anchor 1010 may attach to two opposite ends of the inner mast wall 1002. In some exemplary embodiments, the structural anchor 1010 may be coupled to the second rotor 1009. In some exemplary embodiments, the structural anchor 1010 may be situated above the central housing 1007 and the structural support 1005 within the mast of a wind turbine system in accordance with the present invention.

Figure 11:
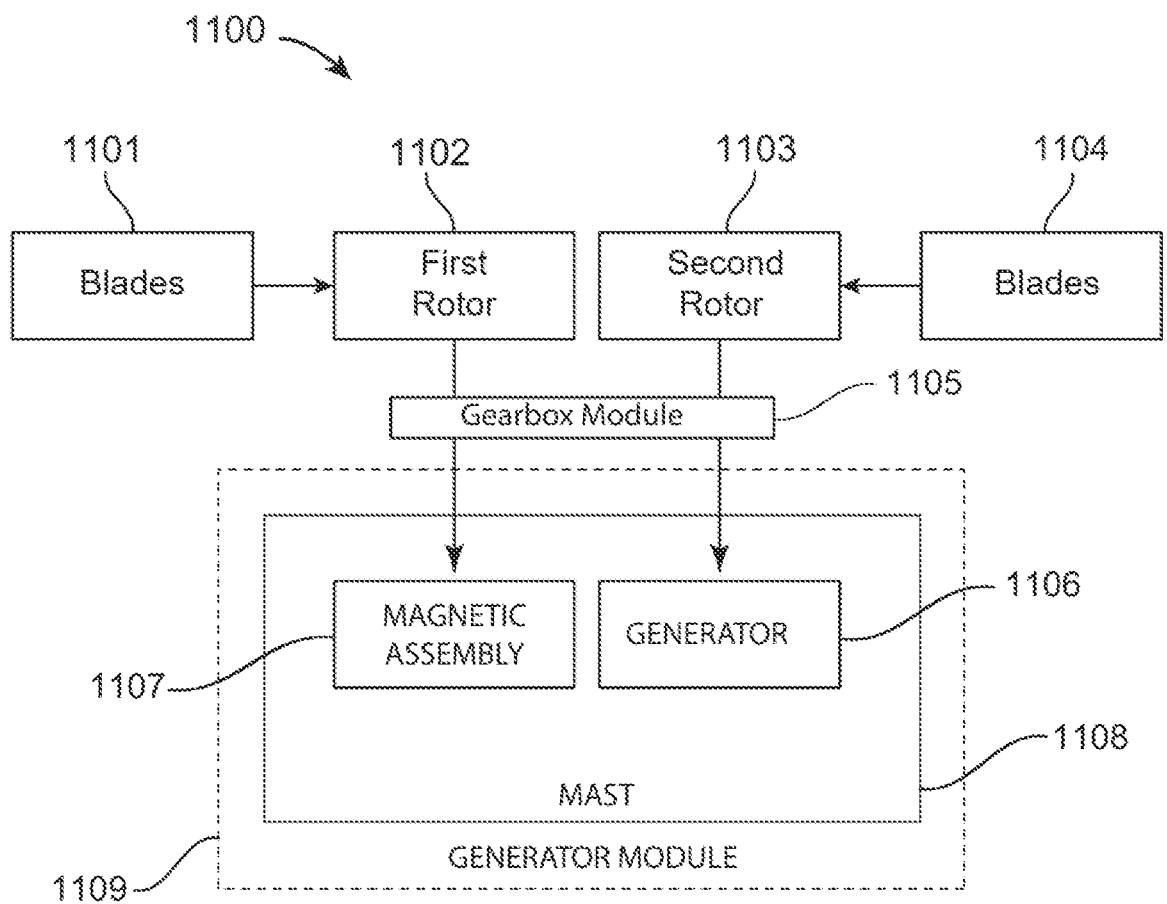
FIG. 11 illustrates a block diagram in accordance with some exemplary embodiments of the present invention.

FIG. 11 illustrates a block diagram in accordance with some exemplary embodiments of the present invention. More specifically, FIG. 11 illustrates a wind turbine system 1100, including two sets of blades 1101, 1104, two rotors 1102, 1103, a gearbox module 1105, and a generator module 1109. In some exemplary embodiments, a wind turbine system in accordance with the present invention may include the sets of blades 1101, 1104. In some exemplary embodiments, a set of blades 1101 may be coupled to a first rotor 1102. In some exemplary embodiments, a set of blades 1104 may be coupled to a second rotor. In some exemplary embodiments, the first and second rotors 1102, 1103 are coupled to a gearbox module 1105. In some exemplary embodiments, as illustrated by FIG. 11, the gearbox module 1105 may be coupled to a generator module 1109 situated within the mast 1108 of the wind turbine system. In some exemplary embodiments, the generator module 1109 may include a generator 1106, a magnetic assembly 1107, and a mast 1108. In some exemplary embodiments, the first rotor 1102 may be coupled to the magnetic assembly 1107. In some exemplary embodiments, the rotational force of a first rotor 1102 may be utilized to rotate a magnetic assembly 1107 across a set of coiled wires situated within the mast. In some exemplary embodiments, the second rotor 1103 may be coupled to a generator 1106. In some exemplary embodiments, the rotational force of a second rotor 1103 may be utilized to rotate a generator 1106. In some exemplary embodiments, the mast 1108 of a wind turbine system in accordance with the present invention acts as a conduit for the generator module 1109.

A MULTIPLE GENERATOR WIND TURBINE SYSTEM has been described. The foregoing description of the various exemplary embodiments of the invention has been presented for the purposes of illustration and disclosure. It is not intended to be exhaustive or to limit the invention to the precise form disclosed. Many modifications and variations are possible in light of the above teaching without departing from the spirit of the invention.

What is claimed is:

1. A wind turbine system comprising:
   a set of blades adapted to rotate on a horizontal axis and coupled to a first rotor;
   a first generator coupled to the first rotor, the first generator disposed within a housing;
   a mast extending from the housing;
   a second rotor and a second generator located at least partially inside the mast;
   a first gearbox adapted to engage the first rotor through a first gear shaft and engage the second rotor through a second gear shaft;
   a second gearbox adapted to selectively engage the second rotor and the second generator when a windspeed exceeds a threshold windspeed; and
   a magnetic assembly disposed within the mast and coupled to the second gearbox, the magnetic assembly adapted to induce an electric current.

2. The system of claim 1, further comprising a controller adapted to monitor the windspeed.

3. The system of claim 2, wherein the controller is further adapted to engage or disengage the second gearbox based on the windspeed exceeding the threshold windspeed.

4. The system of claim 2, wherein the controller is further adapted to continuously adjust engagement of the second gearbox based on the windspeed.

5. The system of claim 1, wherein the second gearbox is further adapted to increase a resistance required to rotate the set of blades.

6. The system of claim 1, wherein the second gearbox is further adapted to selectively couple or decouple the second rotor.

7. The system of claim 1, wherein the second gear shaft includes an input shaft and an output shaft, the input shaft adapted to disconnect from the output shaft.

8. The system of claim 7, wherein the input shaft is further adapted to transfer mechanical power to the output shaft.

9. The system of claim 1, wherein the second gearbox is adapted to engage or disengage the magnetic assembly based on the windspeed exceeding the threshold windspeed.

10. The system of claim 1, wherein the magnetic assembly is further adapted to rotate within the mast when engaged.

11. A wind turbine system, comprising:
    a set of blades adapted to rotate on a horizontal axis and coupled to a first rotor;
    a first generator coupled to the first rotor; the first generator disposed within a housing;
    a mast extending from the housing;
    a second rotor and a second generator located at least partially within the mast;
    a first gearbox adapted to engage the first rotor through a first gear shaft and engage the second rotor through a second gear shaft;
    a second gearbox adapted to selectively engage the second rotor and the second generator when a windspeed exceeds a threshold windspeed; and
    a magnetic assembly disposed within the mast and coupled to the second gearbox, the magnetic assembly adapted to induce an electric current, wherein the magnetic assembly includes a plurality of magnets situated along an outer wall of the second rotor.

12. The system of claim 11, further comprising an inner mast wall and an outer mast wall defining an inner volume therebetween.

13. The system of claim 12, wherein the inner volume is adapted to house a set of coiled wires.

14. The system of claim 13, wherein the set of coiled wires is adapted to have a voltage induced in them by the magnetic assembly.

15. A wind turbine system, comprising:
    a set of blades adapted to rotate on a horizontal axis and coupled to a first rotor;
    a first generator coupled to the first rotor, the first generator disposed within a housing;
    a mast extending from the housing;

a second rotor and a second generator located at least partially within the mast;

a first gearbox adapted to engage the first rotor through a first gear shaft and engage the second rotor through a second gear shaft;

a second gearbox adapted to selectively engage or disengage the second rotor and the second generator when a windspeed exceeds a threshold windspeed;

a structural support adapted to rotate and coupled to a magnetic assembly; and the magnetic assembly disposed within the mast and coupled to the second rotor, the magnetic assembly adapted to induce an electric current, wherein the magnetic assembly includes a plurality of magnets situated along an outer wall of the second rotor.

16. The system of claim 15, further comprising an inner mast wall and an outer mast wall defining an inner volume therebetween, the inner volume adapted to house a first set of coiled wires.

17. The system of claim 16, further comprising a set of struts, the set of struts adapted to couple the second rotor and the structural support.

18. The system of claim 15, further comprising a central housing, the central housing situated within the mast and adapted to at least partially house the second gearbox and the second rotor.

19. The system of claim 18, further comprising a second set of coiled wires situated on an outer wall of the central housing.

20. The system of claim 19, wherein the first set of coiled wires and the second set of coiled wires are adapted to have a voltage induced in them by the magnetic assembly.

\* \* \* \* \*